United States Patent [19]

Schijve et al.

[11] Patent Number: 4,500,589
[45] Date of Patent: Feb. 19, 1985

[54] LAMINATE OF ALUMINUM SHEET MATERIAL AND ARAMID FIBERS

[75] Inventors: Jacobus Schijve, Pijnacker; Laurens B. Vogelesang, Nieuwkoop, both of Netherlands; Roelof Marissen, Cologne, Fed. Rep. of Germany

[73] Assignee: Technische Hogeschool Delft, Delft, Netherlands

[21] Appl. No.: 533,883

[22] Filed: Sep. 20, 1983

Related U.S. Application Data

[63] Continuation of Ser. No. 388,037, Jan. 8, 1982, abandoned.

[30] Foreign Application Priority Data

Jan. 9, 1981 [NL] Netherlands ............... 8100087

[51] Int. Cl.³ ............................ B32B 15/08
[52] U.S. Cl. ..................... 428/213; 428/215; 428/216; 428/252; 428/294; 428/416; 428/418; 428/425.8; 428/458; 428/474.4; 428/902; 428/910
[58] Field of Search .......... 428/294, 416, 418, 425.8, 428/458, 902, 910, 213, 215, 216, 252, 474.4

[56] References Cited

U.S. PATENT DOCUMENTS

| 3,189,054 | 6/1965 | Rucks et al. ............... 138/143 |
| 3,321,019 | 5/1967 | Dmitroff et al. ............ 170/159 |
| 4,029,838 | 6/1977 | Chamis et al. ............. 428/301 |
| 4,035,694 | 7/1977 | Barton et al. .............. 361/400 |
| 4,369,222 | 1/1983 | Hedrick et al. ............. 428/216 |

FOREIGN PATENT DOCUMENTS

| 0013146 | 9/1980 | European Pat. Off. |
| 635823 | 4/1950 | United Kingdom . |
| 1303301 | 1/1973 | United Kingdom . |

OTHER PUBLICATIONS

"Look to metal-plastic laminates", Design Engineering, Jun. 1980, pp. 51-53.
David K. Klapprott et al., "Improved Fatigue Life Through High Modulus-fiber Reinforcement of Adhesives", National Sampe, Apr. 1975, pp. 563-581.

*Primary Examiner*—Marion E. McCamish
*Attorney, Agent, or Firm*—Stevens, Davis, Miller & Mosher

[57] ABSTRACT

The invention relates to a laminate composed of two, three, four or more aluminum-containing metal sheets. The metal sheets, which may for instance be of an aluminum alloy, are bonded together by means of adhesive layers. In the adhesive layers, which are of a thermohardening material, there are embedded poly-paraphenylene terephthalamide threads. These threads are provided in the form of yarns made up of endless filaments and lie in a practically straight line in the adhesive which substantially consists of a thermohardening material. The adhesive layers contain the threads in an amount of 20 to 80% by weight.

14 Claims, 11 Drawing Figures

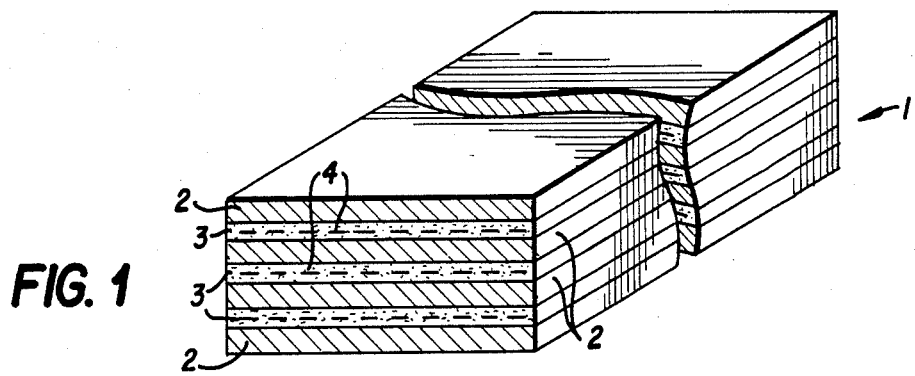
FIG. 1
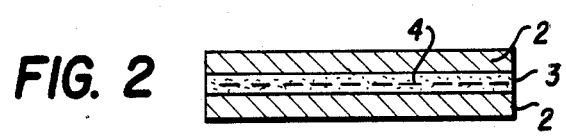
FIG. 2
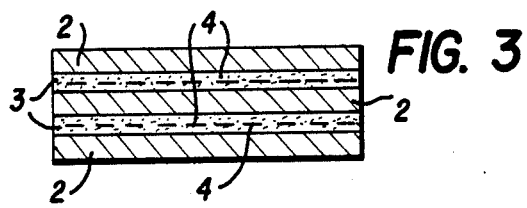
FIG. 3
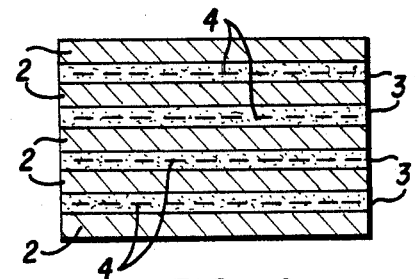
FIG. 4
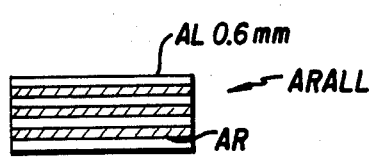
FIG. 6
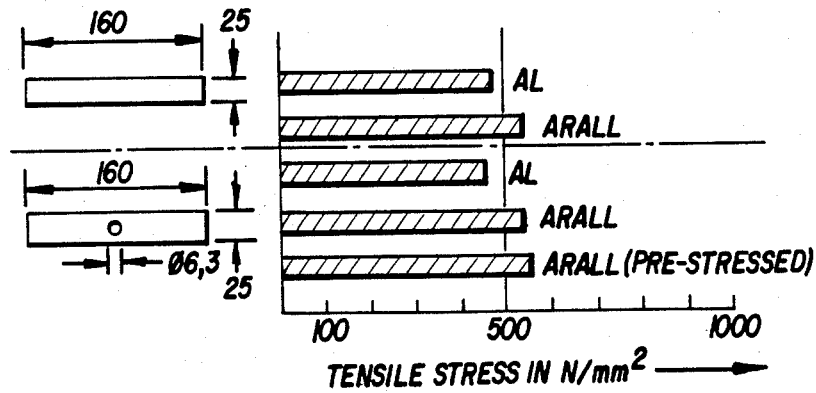

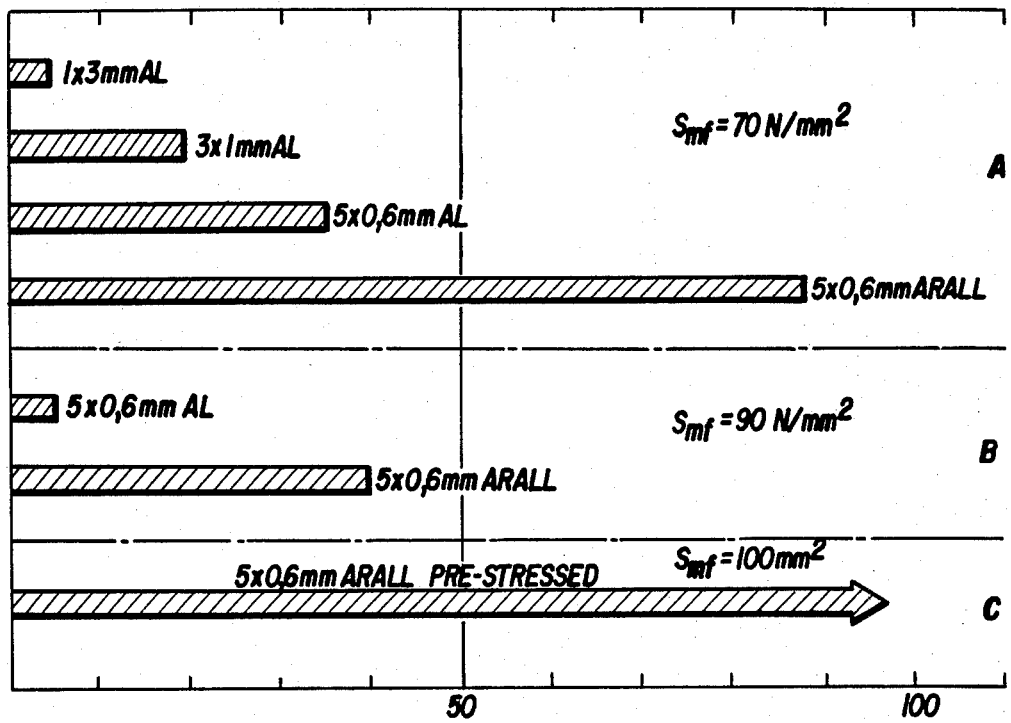
FIG. 8
FIG. 9
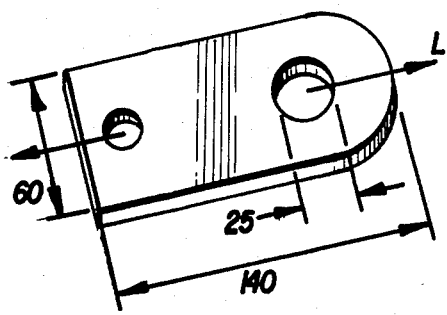
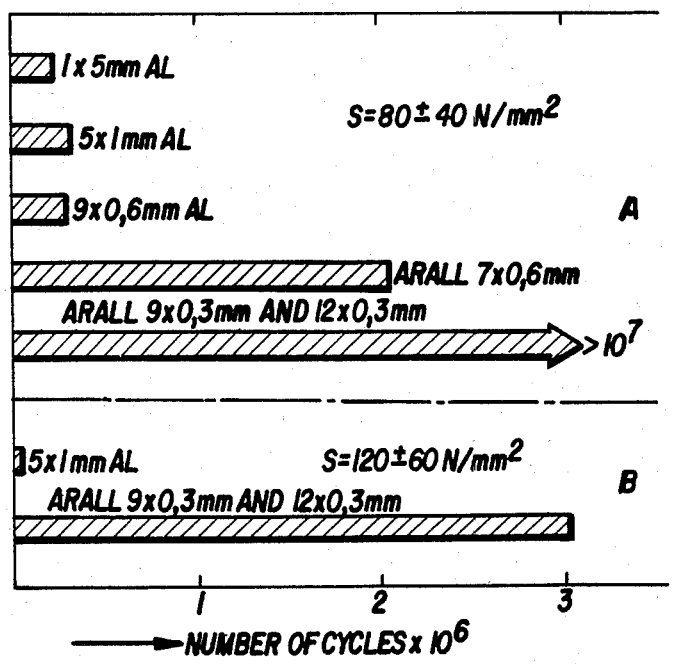

LAMINATE OF ALUMINUM SHEET MATERIAL AND ARAMID FIBERS

This application is a continuation, of application Ser. No. 388,037, filed Jan. 8, 1982 now abandoned.

The present invention relates to a laminate composed of at least two aluminum-containing A laminate of the general type indicated above may be considered to be more or less known from European patent application EP No. 001 3146. However, the laminate described in this reference is of the metal-thermoplastic-metal type, which is limited to a structure consisting of two very thin sheets between which here is provided an adhesive in the form of a thermoplastic material. On page 47 of the European patent application, it is disclosed that the thermoplastic material may contain modifying agents in the form of glass fibres and other high modulus, high performance fibres, such as graphite, boron, steel, aromatic polyamide fibres, potassium titanate whiskers and the like. Because of the presence of only two very thin metal sheets having a thickness generally in the range of 0.0127–0.254 mm and a thermoplastic adhesive, this laminate is destined for uses which require considerable and ready deformation; one such use is as panels for automobile bodies. A disadvantage of the thermoplastic adhesive is that this known laminate does not lend itself very well for use at rather high temperatures. Moreover, the fibres present in the thermoplastic material will not provide an optimum contribution to the strength of the laminate. Further, the fibres contained in the thermoplastic material of this known laminate are to be present in the form of short, discontinuous fibres in order to permit the required high deformation of the laminate which, however, has a limiting effect on improvement of the mechanical properties of the laminate brought about by use of the fibres. Except for some instances in which these laminates are reasonably effective, these known laminates call for further optimization. More particularly, these known laminates are not suitable for use as primary load bearing, rigid structural aircraft components. Moreover, these laminates do not meet the high demands made of late in air and space craft engineering, especially as far as weight saving is concerned with a view to the highly increased price of fuel.

The laminate according to the invention is characterized in that the fibres are provided in the form of polyparaphenylene terephthalamide yarns made up of endless filaments which are so contained in the completed laminate that they lie in a practically straight line in the adhesive which substantially consists of a thermohardening material, and the filaments are of a material whose modulus of elasticity is higher than $5 \times 10^4$ N/mm$^2$, and the adhesive layers contain the filaments in an amount of 20 to 80% by weight, calculated on the total weight of adhesive and threads. Such a laminate has particularly favourable mechanical properties and, more particularly, improved fatigue properties.

The laminate according to the invention is with advantage characterized in that the thickness of each of the metal sheets is in the range of 0.3 to 0.7 mm, and the metal sheets are formed of a material having a tensile strength higher than 350 N/mm$^2$. By preference, the metal sheets in the laminate according to the invention are of an aluminum alloy, such as an aluminum-copper alloy, more particularly of the type AA(USA) No. 2024-T$_3$, or an aluminum-zinc alloy, more particularly of the type AA(USA) No. 7075-T$_6$.

The laminate according to the invention is further characterized in that the reinforcing threads in the adhesive layers are formed of a material whose modulus of elasticity is not higher than $25 \times 10^4$ N/mm$^2$, it being preferred to use threads having a modulus of elasticity in the range of from $10 \times 10^4$ to $15 \times 10^4$ N/mm$^2$, more particularly about $13 \times 10^4$ N/mm$^2$. The modulus of elasticity envisaged here is determined in accordance with ASTM-D 2343.

Threads of polyparaphenylene terephthalamide and their properties are described in a paper by Kh. Hillermeyer and H. Weyland: "An aramid yarn for reinforcing plastics", Plastica, November 1977, No. 11, pp. 374 through 380.

A preferred embodiment of the laminate according to the invention is characterized in that the threads are arranged in one or more groups and extend parallel to one another. According to the invention the threads may be provided in the form of a plain weave fabric having 7 to 11, preferably about 9, warp yarns per cm, each having a linear density of decitex 1200–2000, preferably about decitex 1610, and 750 to 1250 filaments, preferably about 1000 filaments. The weft of the fabric may be made up of 5.5 yarns per cm, each having a linear density of dtex 200 and 125 filaments.

According to the invention the threads may with advantage be provided in one or more layers, or the threads may extend in two or more different directions.

A favourable embodiment of the laminate according to the invention is characterized in that the laminate is composed of three, four, five or more metal sheets between which there are provided threads having a high modulus of elasticity, and the metal sheets and the threads are bonded together by means of an adhesive, for instance a metal glue, the threads being contained in the adhesive layers in an amount of from 20 to 30, up to 80, preferably about 45 to 50 or up to 55% by weight.

The optimum number of metal sheets may be determined depending on the application envisaged and the requirements to be satisfied. Although there is generally no limit to the number of metal sheets to be used, the number of metal sheets will generally not be more than 25. By choosing the proper type of adhesive in combination with reinforcing threads of the proper material a laminate is obtained, according to the invention, in which the thickness of each of the metal sheets is greater than the thickness of the individual, threads-containing layers of adhesive. Thin sheet material is to be preferred to thick sheet material because of its better static and dynamic properties. Thin sheet material is also to be preferred with a view to the occurrence of delamination during fatigue loading. Using a relatively great number of thin metal and threads-adhesive layers instead of a smaller number of relatively thick layers will cause the shear stress peak in the glue to be lowered and the chance of delamination will be reduced. If according to the invention the sheet thickness is optimized (optimum metal-threads ratio), said favourable results will be obtained.

The laminate according to the invention may be applied with particular advantage as structural components in a vehicle or in a space- or aircraft, for instance as lower wing skin material, partly in order to obtain a saving on weight of the construction and partly with a view to safety as far as crack formation is concerned.

As adhesive may be used a good metal glue, such as BSL 312 UL or FM-123-5 or FM 73 marketed by Ciba-Geigy or the glue types AF 126-2 and AF 162-3 marketed by 3M Company. However, other warm- or cold-curing metal glues may also be used. In the completed laminate according to the invention the adhesive layer is formed of a thermohardening synthetic material on a basis of, for instance, epoxy resin. In contradistinction to a thermoplastic synthetic material, a thermohardening synthetic material will not turn plastic or melt at elevated temperatures.

BRIEF DESCRIPTION OF THE DRAWINGS

The preferred embodiments of the invention will now be described in greater detail, with reference being made to the accompanying drawings, in which:

FIG. 1 is a perspective view of one embodiment of the laminate according to the present invention;

FIGS. 2–4 are cross-sectional views of three different embodiments of the laminate according to the present invention;

FIG. 6 is a diagram showing the results of tensile stress tests conducted on three different types of test specimens;

FIG. 8 is a diagram showing the results of simulated flight tests wherein varying loads were applied to three different types of test specimens;

FIG. 9 is a perspective view of a laminate of the lug type, and a diagram showing the results of fatigue tests carried out on different laminate materials of this type;

DESCRIPTION OF THE PREFERRED EMBODIMENTS

Figure 7:
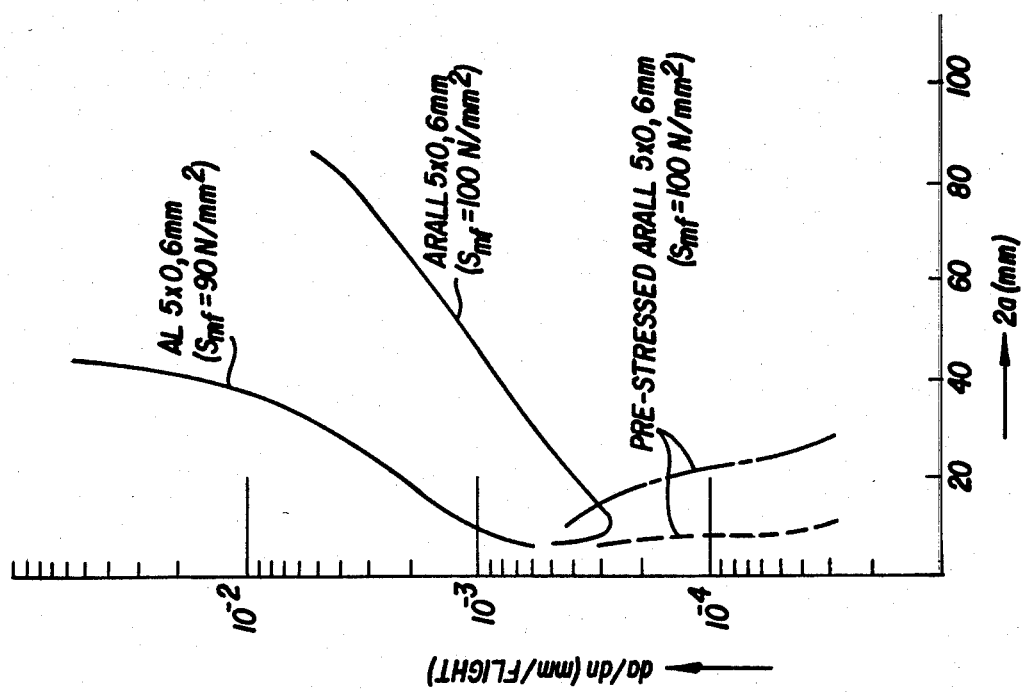
FIG. 7 is a diagram showing the results of simulated flight tests conducted on three different types of test specimens.

An example of a laminate according to the invention is schematically shown in perspective in FIG. 1. The laminate is generally referred to by the numeral 1 and is built up of four metal sheets 2 which are bonded together by means of interposed threads-adhesive layers 3, in which the threads are contained in the form of a fabric in which the warp is formed by the threads 4 having a high modulus of elasticity. The FIGS. 2, 3 and 4 schematically illustrate cross-sections of laminates according to the invention, viewed in the direction transverse to the warp threads 4, of the reinforcing fabrics. In the FIGS. 1 through 4 corresponding parts are referred to by like numerals. The laminates illustrated are made up of different numbers of layers. The laminate according to FIG. 2 consists of two outer metal sheets 2, which are bonded together by means of the interposed threads-adhesive layer 3. The laminate according to FIG. 3 comprises three metal sheets 2, which are bonded together by means of two interposed threads-adhesive layers 3. The laminate according to FIG. 4 is built up of five metal sheets 2, which are bonded together by means of four threads-adhesive layers 3. The laminates according to FIGS. 1, 2, 3 and 4 are entirely symmetrical with a plane through the middle of the laminates and parallel to the plane of the metal sheets. In principle it is also possible to construct laminates that are not symmetrical with a plane parallel to the metal sheets.

Figure 11:
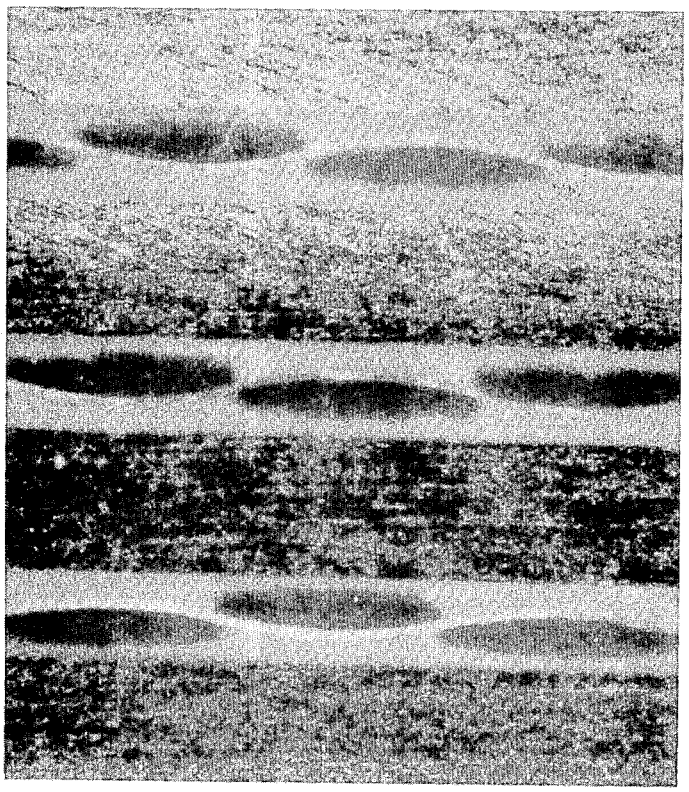
FIG. 11 is a photograph of a highly magnified cross-sectional view of a laminate of the present invention.

The photograph shown in FIG. 11 is a highly magnified cross-sectional view (40 x) in the direction perpendicular to the warp threads of a laminate of four metal sheets with three interposed threads-adhesive layers of the type according to FIG. 1. The laminate depicted in the photograph is made up of four metal sheets of an aluminum-copper alloy of the type AA(USA) No. 2024 frequently applied in aircraft building. The thickness of the metal sheets was 0.6 mm. The reinforced layer of adhesive between every two sheets is built up of two adhesive films of a good metal glue each having an initial thickness of 0.08 mm and a mass of 100 grams/m². Between these two glue films there is provided a fabric of aramid yarns of the type mentioned before, this fabric having a thickness of about 0.10 mm and a mass of 150 to 180 grams/m². The glue utilized is of the type that can be cured only upon being heated to 120° C.

The procedure utilized for making the laminate shown in FIG. 11 was as follows. First, four identical metal sheets of said aluminum-copper alloy were superimposed on a movable support, with two films of adhesive containing an aramid fabric being placed between every two successive metal sheets. The resulting laminate of loose parallel parts, viz. four metal sheets and three layers of adhesive with reinforcing fabrics, was covered with some thin plastic sheet material while it was still on the support. Subsequently, the wrapped up laminate of loose parts was compressed by creating a vacuum inside the wrapping of the laminate. Next, the wrapped laminate and its support were placed in an autoclave. After the autoclave had been closed, the laminate in it was subjected to an air pressure of 6 bar and the temperature was increased to 120° C. After a 30 minute stay in the autoclave the laminate was finished and was removed from the autoclave. Before being bonded together with the adhesive layers, the metal sheets must, of course, be subjected to some appropriate pretreatments, such as alkaline degreasing, etching in a chromic-sulphuric acid bath, anodizing in chromic or sulphuric acid, applying a primer appropriate to the type of glue used, e.g. on a basis of epoxy phenol and having corrosion inhibiting properties, or the like.

In a simultaneously filed application in the name of applicant it is set forth that a further improvement of the laminate according to the invention may be obtained when it is pre-stressed.

Figure 5:
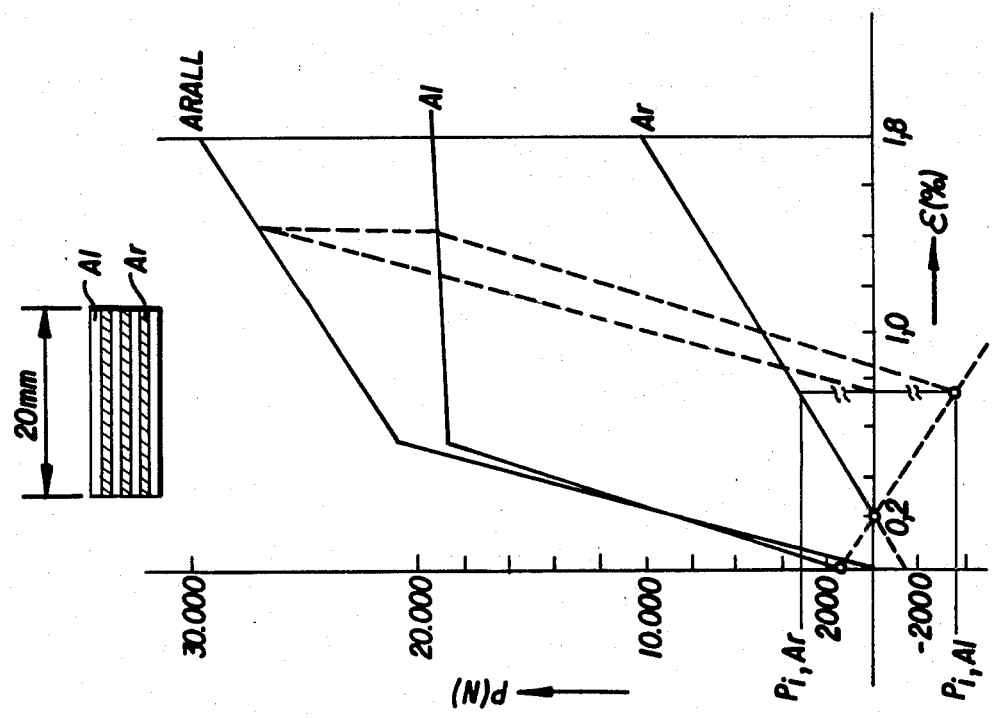
FIG. 5 is an illustrative diagram that helps to explain the method of manufacture utilized in the present invention.

FIG. 5 serves to illustrate and explain the process for the manufacture of a pre-stressed laminate by the method in which the metal sheets are subjected to plastic deformation. This example also deals with a laminate of four metal sheets of said aluminum-copper alloy type A (USA) No. 2024, the sheets having a thickness of 0.6 mm. The four aluminum sheets (Al) are bonded together by way of three interposed threads-adhesive layers of metal glue which each contain an aramid fabric (Ar). The threads-adhesive layers each have a thickness of 0.25 mm. The laminate sample (ARALL) on which the measurements were conducted had a width of 20 mm. In FIG. 5, the % specific elongation is plotted as the abscissa against the tensile load P (expressed in newton) as the ordinate. For the three materials the specific elongation with increasing tensile force is indicated by the lines ARALL, Al and Ar. The ARALL line relates to the laminate in its entirety. The Al line relates to the behaviour of said aluminum alloy in itself. The Ar line relates to the behaviour of the threads-adhesive layer, i.e. an adhesive layer containing a fabric composed of poly-paraphenylene terephthalamide threads. As the bond is brought about here under the influence of heat (120° C.), the Al and the Ar lines do not begin at the zero point because of the behaviour during cooling after the bonding process and the difference in coefficients of expansion between aluminum and aramid. FIG. 5 shows that a laminate (ARALL) is obtained which is unloaded in its entirety and has a compressive stress in the aluminum sheets (Al) in the order of, say, 88.5 N/mm$^2$ and a tensile stress in the adhesive-aramid layers (Ar) of identical magnitude. The laminate thus prestressed but unloaded in its entirety may be obtained by subjecting the laminate to such an external tensile force in the direction of the warp threads of the aramid fabric that the specific elongation is about 1.4%. FIG. 5 shows that upon the aluminum sheets being unloaded they display a specific plastic elongation of about 0.75%. Depending on the envisaged use of the laminate, the compressive stress desired in the metal sheets of the completed laminate can be pre-set in the manufacture thereof. In FIG. 5 $P_{i,Al}$ and $P_{i,Ar}$ are the internal forces in respectively the aluminum sheets and the adhesive layers containing aramid threads, which forces are equal but of opposite sign. In the present case $P_{i,Al}$ corresponds to an internal stress of 88.5 N/mm$^2$ and the plastic elongation in the aluminum is 0.75%.

FIG. 6 shows the results of tensile tests applied to test specimens without a hole and to test specimens provided with a hole 6.3 mm in diameter. Also these tests were carried out on a laminate of the ARALL type according to the invention, which is built up of 4 metal layers of said aluminum-copper alloy of the type AA(USA) No. 2024 and of 3 aramid fabric-containing layers of adhesive. The tests were carried out on 3 different materials, viz. on test specimens of said solid aluminum copper alloy denoted by Al, on test specimens of said non-prestressed laminate, denoted by ARALL, and on test specimens of the prestressed laminate referred to as ARALL (pre-stressed). From FIG. 6 it is apparent in the first place that the ARALL and the pre-stressed ARALL laminate have a tensile strength which is about 10 to 15% higher than that of solid aluminum (Al). Further, it is considered particularly favourable that in contrast to the situation with solid aluminum the tensile strength of pre-stressed ARALL is not reduced by the test specimen being provided with a hole.

FIG. 7 shows the results of simulated flight tests commonly applied in aircraft engineering. The tests were carried out on three types of laminates. The first laminate consisted of five layers of metal sheets bonded together (referred to as Al), the metal being the aluminum-copper alloy of the type AA(USA) No. 2024, no threads being incorporated in the four layers of adhesive. The second layer was made up of five layers of interbonded aluminum sheet of the same alloy, an aramid fabric (referred to as ARALL) being incorporated in the layers of adhesive. The third laminate was of the same type as the second laminate, except that it was pre-stressed (referred to as pre-stressed ARALL). The test specimens measured 300 mm in length, 100 mm in width and 4 mm in total thickness. The full lines and the dash lines indicate the results obtained with test specimens, which prior to the test were provided with a 7 mm saw cut. The dot-dash line indicates the results obtained with test specimens which prior to the test were provided in their centers with a circular hole 11 mm in diameter. FIG. 7 gives the results of fatigue tests conducted on three types of laminates, the test specimens being subjected to a varying load in accordance with a special flight simulation program. In FIG. 7 the crack length 2 a in mm is plotted on the abscissa and the crack propagation rate da/dn in mm/flight on the ordinate. Comparing the Al line with the ARALL line shows that the crack propagation rate in the ARALL laminate is considerably lower than in the Al laminate. For the pre-stressed ARALL the results are even far more favourable, since in that case the crack propagation rate decreases to almost zero. Also, when the tests with pre-stressed ARALL were carried out on a somewhat different test specimen, namely one with a large hole in its center, the results turned out particularly favourable, as is apparent from the trend of the dash line. In FIG. 7 $S_{mF}$ indicates the mean stress in the test specimen during the simulated flight.

Also FIG. 8 gives the results of experiments using varying loads in accordance with a simulated flight test program practiced in aircraft engineering. All tests were carried out on specimens of 300×100 mm, 3–4 mm thick and provided with a 3 mm saw cut in their middle. The tests were carried out on five different kinds of material, viz. in the first place solid aluminum having a thickness of 3 mm (1×3 mm Al); in the second place an aluminum laminate of three metal sheets having a thickness of 1 mm, without threads being contained in the adhesive (3×1 mm Al); in the third place an aluminum laminate of five metal sheets having a thickness of 0.6 mm, without threads being contained in the layers of adhesive (5×0.6 mm Al); in the fourth place a laminate of five aluminum sheets having a thickness of 0.6 mm and a reinforcing fabric of aramid threads contained in the layers of adhesive (5×0.6 mm ARALL); and in the fifth place a laminate of the last-mentioned type which is pre-stressed (5×0.6 mm ARALL pre-stressed). The aluminum is again formed by the aluminum-copper alloy of the type AA(USA) No. 2024. FIG. 8 gives for the various materials the number of simulated flights after which the test specimens ruptured. In the rectangles A, B and C are the results of the tests in which a progressively increasing mean load was applied to the test specimens, viz. $S_{mF}=70$, 90 and 100 N/mm$^2$, respectively. Already from rectangle A in FIG. 8 it is apparent that the behaviour of the ARALL material comprising metal sheets 0.6 mm thick, i.e. a thickness well below 1 mm, is particularly favourable. The results of tests in which a higher mean load was applied, shown in Rectangle B, confirm the favourable behaviour of the ARALL material. Finally, in rectangle C are the results of subjecting a test specimen of the pre-stressed ARALL laminate to an even higher load. It shows that even after as many as 100,000 simulated flights the pre-stressed ARALL laminate had not yet ruptured.

FIG. 9 gives the results of fatigue tests on specimens of the lug type, drawn at the top in FIG. 9, that were subjected to a varying load at constant amplitude. The tests were carried out on various types of materials which are denoted in the same way as in FIG. 8. From the results mentioned in rectangle A, it appears that the ARALL laminate of metal sheets having a thickness of less than 1 mm possesses particularly favourable properties and that the results even improve with decreasing layer thickness of the metal sheets. In rectangle B of FIG. 9, the test results obtained under a higher mean load are shown and in this case also it can be seen that ARALL laminate exhibits a particularly favourable behaviour.

Figure 10:
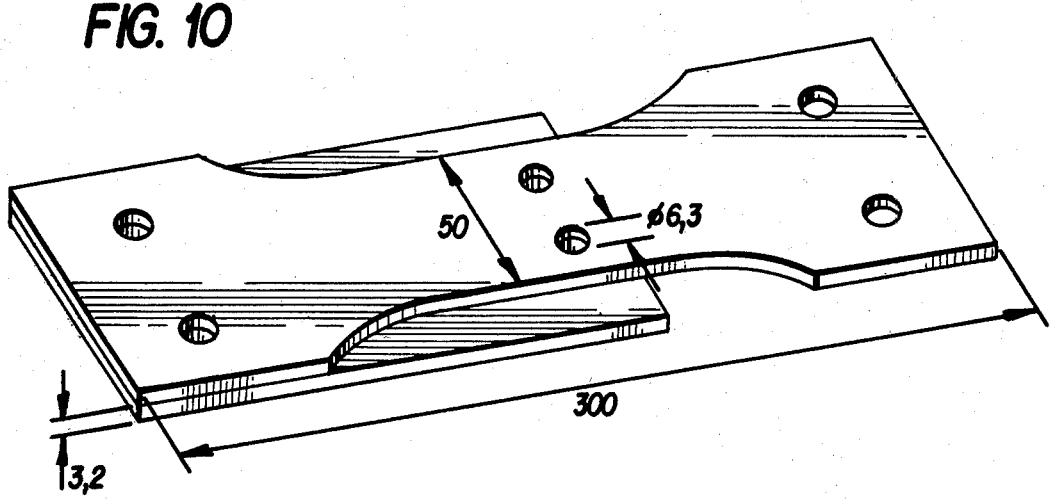
FIG. 10 is a perspective view of a laminate of the bolt-joint type, and a diagram showing the results of tests carried out on different laminate materials of this type.
Figure 10:
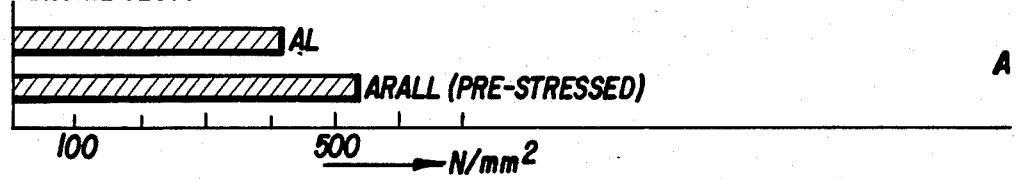
Figure 10:
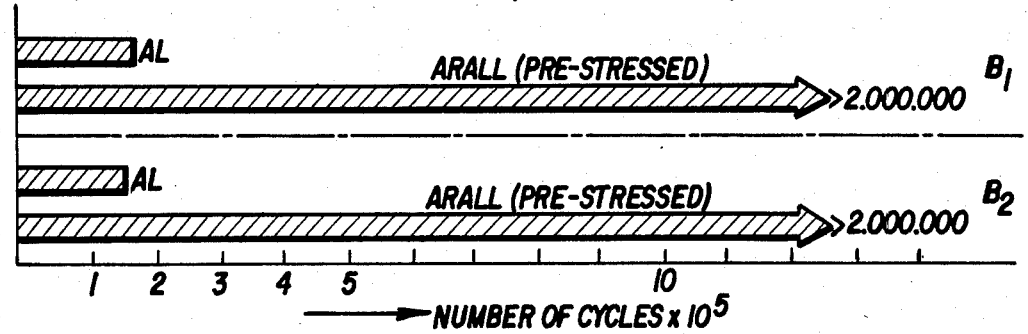
Figure 10:
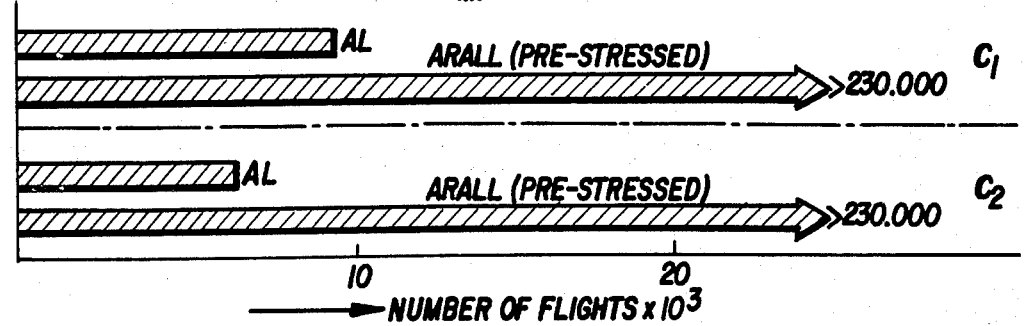

FIG. 10 shows the results of tests carried out on material of the bolt-joint type commonly used in aircraft engineering. A test specimen of this type, drawn in perspective in FIG. 10 at the top, is provided with a bore 6.3 mm in diameter for accommodating a bolt. In rectangle A of FIG. 10 are the results of tensile tests, mentioning the tensile strength in $N/mm^2$. These results show that the pre-stressed ARALL laminate has a tensile strength which is about 22% higher than that of solid aluminum sheet material (Al). The aluminum sheets are of the same kinds of alloys as mentioned with reference to FIGS. 6–9. In the rectangles $B_1$ and $B_2$ of FIG. 10 are the results of tests using a varying tensile load at constant amplitude. They show that the test specimen of pre-stressed ARALL laminate may be subjected to a practically infinite number of loading cycles without being ruptured. Rectangle $B_2$ gives the results for test specimens which had previously been exposed for 6 weeks to a moist salt atmosphere. $B_1$ shows the results obtained with test specimens which had merely been exposed to the normal atmosphere.

In rectangles $C_1$ and $C_2$ of FIG. 10 are the results of tests in which the test specimens were subjected to a highly fluctuating load in accordance with a flight simulation program as used in aircraft engineering. These results show that the pre-stressed ARALL laminate withstands a practically unlimited number of simulated flights. In rectangle $C_2$ are the results obtained with test specimens that had previously been exposed for 6 weeks to a damp salt atmosphere. Rectangle C gives the results obtained with test specimens that had merely been exposed to the normal atmosphere. Comparing the results of $C_1$ and $C_2$ shows that, unlike the test specimens of solid aluminum the test specimens of pre-stressed ARALL laminate were not affected by the salt atmosphere.

The above-described test results mainly relate to laminates according to the invention, the metal sheets being of an aluminum-copper alloy which finds large scale application in aircraft engineering, the layers of adhesive of a thermohardening material containing a fabric of polyparaphenylene terephthalamide threads. The threads used must possess a low creep, as for instance Arenka 930, of which the creep properties are mentioned in said article in Plastica, November 1977, No. 11, pp. 374 through 380.

Within the scope of the invention various modifications may be made. Although in the laminates according to the invention it is preferred to apply metal sheets having the same thickness, it is also possible in principle that in one and the same laminate there may be contained metal sheets which have two or more different thicknesses and are arranged either symmetrically or unsymmetrically.

It is also possible in principle that in one and the same laminate there may be contained sheets of different aluminum-containing metals or aluminum alloys. The laminates according to the invention may in principle be made in the form of sheet material having a width of, say, 1 m and a length of a few meters. Apart from being used in the field of aircraft and spacecraft engineering, the laminates according to the invention also may with advantage find application in various other fields of engineering, particularly those where high demands are made on static, dynamic (fatigue properties) and damage tolerance properties.

Reference is also made to an article by D. K. Klapprott, C. L. Mahone, T. F. Mika, P. M. Stifel and T. J. Apongi entitled "Improved Fatigue Life Through High Modulus Fiber Reinforcement of Adhesives", 20 National Sample, April 1975. This article does not relate to structural components in the form of proper laminates, but only to experiments concerning joining the adjacent edges of two basic titanium metal sheets or plates. The resulting joint is of the double lap or double strip type, i.e., the edges of the metal sheets are covered on both sides with a narrow strip. In FIG. 2 of the Klapprott article, a test specimen is shown in which two relatively thick (0.050 inches = 1.27 mm) metal sheets are joined by two narrow composite strips (thickness also 0.050 inches = 1.27 mm) covering the upper and lower sides of the adjacent edges of the two metal sheets or plates. The two strips are composites, i.e., an epoxy resin matrix reinforced with fibres. These two composite strips are secured to the metal sheets by the adhesive action of the epoxy resin matrix, as a result of which the ends of the two metal sheets are attached to each other. The Klapprott et al article is particularly concerned with experiments in which use is made of composites which are reinforced with high modulus fibres. The Klapprott article primarily demonstrates that the fatigue life of double lap type joints between two metal sheets is improved by using composite strips formed by high modulus fibre-reinforced adhesives.

U.S. Pat. No. 3,321,019 describes a helicopter blade which is partially reinforced with a laminate of aluminum sheets and fibreglass cloth.

GB No. 635,823 describes a laminate of metal sheets and a fibrous material, such as a paper fabric of a glass cloth impregnated with synthetic resin. It mentions the use of these known composite sheets for aircraft wings.

Also U.S. Pat. No. 4,029,838 and FR No. 2,322,190 describe composite laminate structures of metal sheets and various kinds of fibres.

GB No. 1,303,301 describes a method of manufacturing a composite material article in the form of a sheet sandwich structure of metal sheets having bonded between them a layer of fibrous reinforced plastic material. Particularly the fibrous material may comprise carbon fibres and/or glass fibers. In order that the fibres may be properly positioned in the completed laminate, said publication describes an apparatus with reference to FIGS. 3 and 4 by means of which some pull is applied to the fibres in order that they may neatly lie in a straight line in the completed laminate. This stretching and straightening of the fibres, however, does not at all lead to an end product that may be considered a pre-stressed laminate.

For when this known laminate is unloaded in its entirety there will be no compressive stress in the metal sheets in combination with tensile stress in the fibres.

U.S. Pat. No. 3,189,054 mainly relates to a tubular laminate article comprising alternatively wound layers of metal, particularly aluminum, and thermoset resin impregnated unidirectional glass fibres. In this tubular structure obtained by filament winding, the overlying layers each consist of wound strips and tapes. Each metal layer consists of a great many adjacent aluminum strips, the interpositioned layers being formed of a great many adjacent glass fibre tapes. Although this publication must therefore be considered to relate to laminates of a kind different from that according to the present application, U.S. Pat. No. 3,189,054 does mention that the layers of metal and glass fibres are prestressed.

DE No. 2,916,299 describes a method of manufacturing a laminate made up of several layers of a low-melting metal having fibre-reinforced layers positioned between them.

On its outside the laminate is covered with layers of a material which has better thermal and mechanical properties than the low-melting metal layers. The method comprises a treatment at elevated temperature at which the low-melting metal penetrates into the fibrous fabric.

FR No. 2,447,272 describes a specifically laminated upholstery panel for motor-cars. The panel consists of a laminate which is formed in the first place by a number of sheets of an aluminum alloy between which there are placed sheets of thermoplastic material, e.g. polyester. One side the laminate is also covered with several layers of a fabric made up of aramid fibres for absorbing shock loads. These known panels form a laminate of a type which is entirely different from that according to the present application, which is quite evident from the fact that the various layers are attached to each other by screws.

U.S. Pat. No. 4,035,694 describes a metal-clad dielectric sheeting useful in the manufacture of printed circuitry comprising an electrically conductive metallic layer adhered to a nonwoven web that comprises a unique fibre blend compacted and held together by a polymeric binder material. The fibre blend includes heat-resistant fibres, preferably aromatic polyamide fibres, and high-tensile-strength fibres that absorb little moisture. This known laminate is of a type which is totally different from that according to the present application. Notably, said known laminate is not designed for absorbing high mechanical loads, the fibres being present in the form of a nonwoven web.

DE No. 2,642,881 describes a kind of armour plate formed by a laminate. This known laminate consists of at least one steel sheet on which there are placed a number of sheets of a thermoplastic polyamide, between which there are fabrics of aramid fibres. This known laminate is of a type different from that according to the present application.

We claim:

1. A fiber-reinforced laminate adapted for use as a structural component of an aircraft, comprising:
   at least two sheets of an aluminum alloy, each of said sheets having a thickness of less than 1 mm and a tensile strength of greater than 350 N/mm$^2$;
   an adhesive layer located between each adjacent pair of said sheets, said adhesive layer comprising a thermohardening material disposed between the sheets to bond an adjacent pair of the sheets together;
   aromatic polyamide fibers disposed in each said adhesive layer to reinforce the laminate, said fibers comprising polyparaphenylene terephthalamide yarns made up of endless filaments formed from a material having a modulus of elasticity in the range of $5 \times 10^4$ to $25 \times 10^4$ N/mm$^2$ and an elongation at breakage of at least 2%, said yarns being disposed in substantially straight parallel lines in the adhesive layer and being present in an amount of 20 to 80% by weight based on the combined weight of the thermohardening material and the yarns,
   the thickness of each of the sheets being greater than the thickness of each said adhesive layer containing said fibers.

2. A laminate as claimed in claim 1, wherein the thickness of each of the sheets is in the range of 0.3 to 0.7 mm.

3. A laminate as claimed in claim 1, wherein the yarns are arranged in one or more groups.

4. A laminate as claimed in claim 1, wherein the yarns are in the form of a woven fabric.

5. A laminate as claimed in claim 4, wherein the woven fabric has 7 to 11 yarns per cm., each of said yarns having a linear density in the range of decitex 1200–2000 and containing 750–1250 filaments.

6. A laminate as claimed in claim 5, wherein the woven fabric has 9 yarns per cm., each of said yarns having a linear density of approximately decitex 1610 and containing approximately 1100 filaments.

7. A laminate as claimed in claim 1, wherein the laminate includes at least three sheets.

8. A laminate as claimed in claim 1, wherein each of the sheets comprises a sheet of an aluminum-copper alloy.

9. A laminate as claimed in claim 8, wherein the aluminum-copper alloy is of the type AA (USA) No. 2024-T$_3$.

10. A laminate as claimed in claim 1, wherein each of the sheets comprises a sheet of an aluminum-zinc alloy.

11. A laminate as claimed in claim 10, wherein the aluminum-zinc alloy is of the type AA (USA) No. 7075-T$_6$.

12. A laminate as claimed in claim 1, wherein the yarns are present in each said adhesive layer in an amount of 45 to 55% by weight based on the combined weight of the adhesive layer and the yarns.

13. A laminate as claimed in claim 1, wherein the filaments have a modulus of elasticity in the range of $10 \times 10^4$ to $15 \times 10^4$ N/mm$^2$.

14. A laminate as claimed in claim 1, further characterized in that the crack propagation rate of the laminate in millimeters per cycle of varying load is at least two times less than the crack propagation rate seen when the laminate is not reinforced with fibers, and in that the number of varying load cycles before breakage is at least two times greater than the number of varying load cycles prior to breakage seen when the laminate is not reinforced with fibers.

* * * * *

UNITED STATES PATENT AND TRADEMARK OFFICE
CERTIFICATE OF CORRECTION

PATENT NO. : 4,500,589
DATED : February 19, 1985
INVENTOR(S) : SCHIJVE, et al.

It is certified that error appears in the above-identified patent and that said Letters Patent is hereby corrected as shown below:

On the title page;

In "[63] Related U. S. Application Data", for "388,037" read -- 338,037 --.

Column 1, line 6, for "388,037" read -- 338,037 --.

Signed and Sealed this

Sixth Day of August 1985

[SEAL]

Attest:

DONALD J. QUIGG

*Attesting Officer*     *Acting Commissioner of Patents and Trademarks*